United States Patent [19]
Adams et al.

[11] Patent Number: 5,720,112
[45] Date of Patent: Feb. 24, 1998

[54] ASYMMETRICAL PLUMB BOB AND METHOD

[75] Inventors: Daniel T. Adams, Menlo Park; John Littleboy, San Francisco; Andrew G. Butler, Palo Alto, all of Calif.

[73] Assignee: DWBH Ventures Ltd., Nassau, Bahamas

[21] Appl. No.: 532,022

[22] Filed: Sep. 20, 1995

[51] Int. Cl.⁶ ............................................. G01C 15/10
[52] U.S. Cl. .................................... 33/392; 33/391
[58] Field of Search ....................... 33/293, 295, 391, 33/392, 393, 394, 395, 398; D10/61, 74, 65

[56] References Cited

U.S. PATENT DOCUMENTS

| | | |
|---|---|---|
| 584,803 | 6/1897 | Wilcox ............................ 33/393 |
| 1,212,194 | 1/1917 | Duguid .......................... 33/392 |
| 1,274,662 | 8/1918 | Armour .......................... 33/393 |
| 2,523,351 | 9/1950 | Armstrong ..................... 33/392 |
| 3,405,450 | 10/1968 | Peacock ........................ 33/393 |

FOREIGN PATENT DOCUMENTS

| | | | |
|---|---|---|---|
| 4-25713 | 1/1992 | Japan ............................ 33/392 |
| 1320677 | 6/1973 | United Kingdom ........ 33/392 |
| 2146768 | 4/1985 | United Kingdom ........ 33/293 |

*Primary Examiner*—Thomas B. Will
*Attorney, Agent, or Firm*—Fliesler, Dubb, Meyer & Lovejoy

[57] ABSTRACT

A plumb bob includes an asymmetrical device 22 and the bob weight 20. The asymmetrical device 22 includes a plug 20 which can be received in a cavity 24 of the bob weight 20. Appropriate material such as solder or an adhesive is selected for securing the asymmetric device 22 and the bob weight 20 in a manner that causes the center of gravity of the asymmetric device 22 to be aligned with that of the bob weight 20.

14 Claims, 2 Drawing Sheets

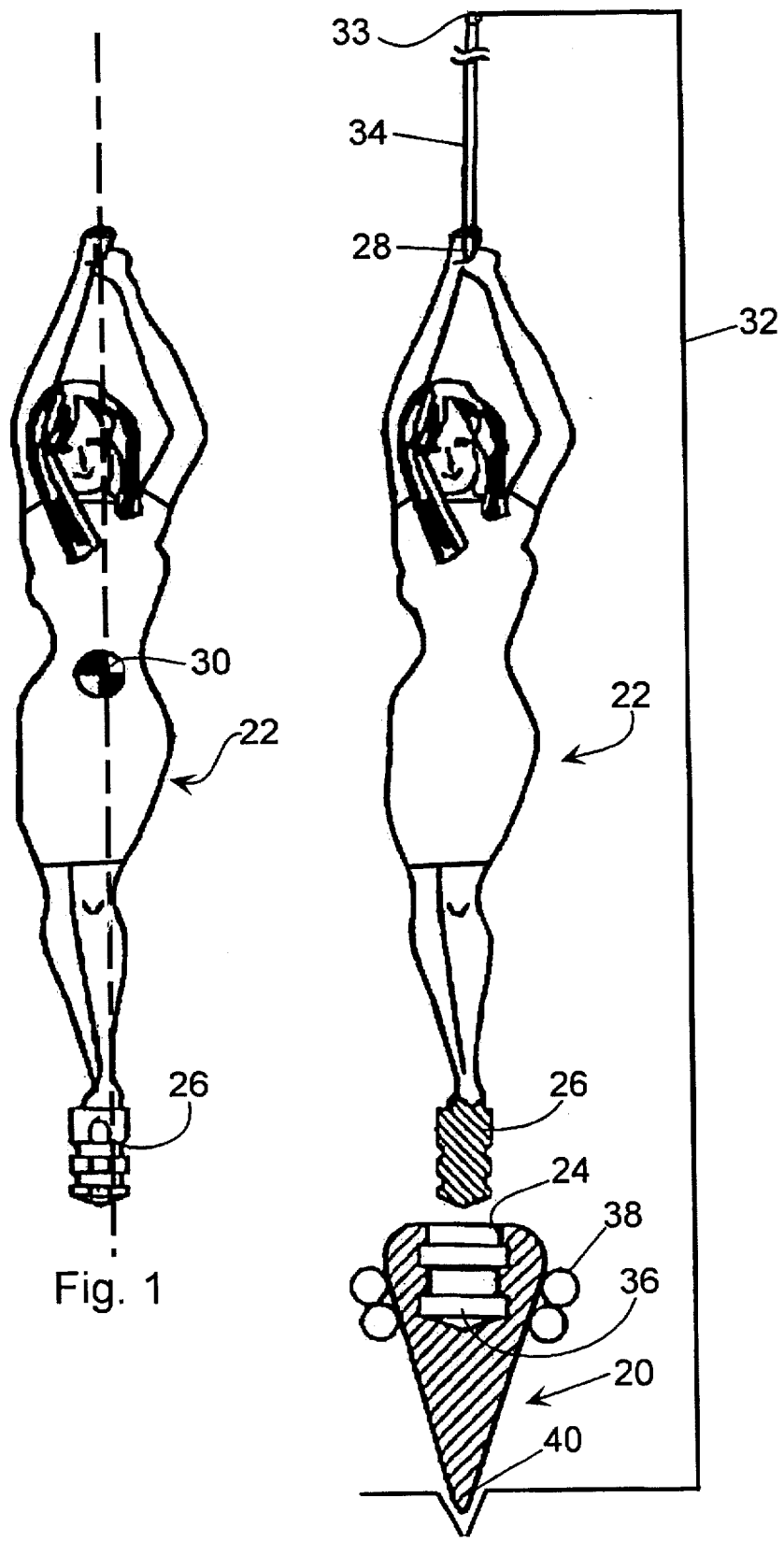

ASYMMETRICAL PLUMB BOB AND METHOD

FIELD OF THE INVENTION

The present invention is directed to a surveying tool and in particular to a plumb bob.

BACKGROUND OF THE INVENTION

Historically, plumb bobs or plummets have been designed as shapes of revolution. By being axially symmetric, a properly made plumb bob will point to a location exactly below the point from which the bob hangs. The symmetry allows the bob to point consistently even when the bob rotates.

A mass manufactured bob will typically have variations due to process tolerances, therefore each bob made by high quantity methods such as injection molding or die-casting needs to be calibrated to function properly. The mass manufactured bob can be altered either by removing material or relocating material in an iterative process until the device hangs true. This process is undesirable due to the complexity of having a moveable mass adjustment system or the aesthetic problems created by grinding or shaving to achieve balance.

SUMMARY OF THE INVENTION

The present invention is directed to overcoming disadvantages of the prior art. In the present invention, a plumb bob comprises an asymmetrical device having a top portion and a bottom portion with the top portion of the asymmetrical device adapted to be hung from a string. The plumb bob includes a bob weight with the bob weight extending from the bottom portion of the asymmetrical device.

In a further embodiment, the asymmetrical device and the bob weight are formed separately with the bottom portion of the asymmetrical device defining a plug. The bob weight defines a cavity which is sized to receive the plug so that the asymmetrical device can be secured in the cavity.

In a further aspect of the invention, the cavity of the bob weight is sized to receive the plug of the asymmetrical device and the material which can secure the plug into the cavity.

In a further aspect of the invention, the material is a liquid solder which solidifies securing the plug in the cavity.

In another aspect of the invention, a method for making the plumb bob comprises the steps of fabricating a device with a first shape and fabricating a bob weight with a second shape. The centers of gravity of the first shape and the second shape are aligned. The first shape and the second shape are secured together with a material that changes states from a fluid state to a rigid state.

Yet another aspect of the method for making a plumb bob comprises the steps of fabricating a device for with a first shape and a plug, and fabricating a bob weight with a second shape and a cavity for receiving the plug. The device is positioned over the bob weight with the center of gravity of the device about on line with the center of gravity of the bob weight with the plug above the cavity. The bob weight is then heated and liquid solder is introduced into the cavity. The device is lowered so that the plug is received in the cavity. Any relative motion between the device and the bob weight is allowed to attenuate. Heat is removed from the bob weight in order to allow the solder to solidify.

In the method, the fabricating steps includes fabricating a device with the first shape which is asymmetrical.

BRIEF DESCRIPTION OF THE FIGURES

FIG. 1 depicts a plan view of an asymmetrical device which comprises a portion of the plumb bob.

FIG. 2 depicts a plan view of an asymmetrical device of FIG. 1 hung from a string and showing the cross-sectional view of a plug with a cross-sectional view of a bob weight held in a fixture.

DETAILED DESCRIPTION OF THE PREFERRED EMBODIMENT

Figure 3:
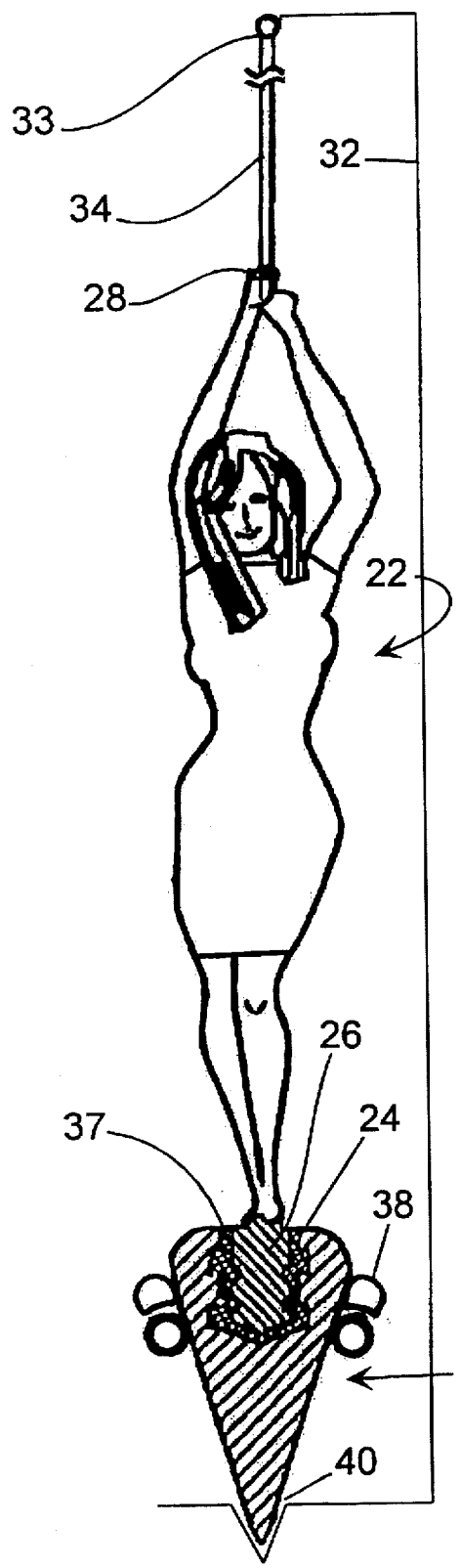
FIG. 3 depicts a view similar to FIG. 2 with the plug of the asymmetrical device lowered into the bob weight and liquid solder introduced into a cavity into a bob weight.

The following method offers a simple way to balance an asymmetrical body. Using this method, a plumb bob can incorporate an asymmetrical device for additional function (for sighting marking, etc.) or an asymmetrical body for decorative purposes. Such decorative asymmetrical body or device can be in the form of a human body.

The plumb bob fabrication method involves a two piece design, using an axially symmetric bob weight 20 (FIG. 2) and an asymmetric die-cast upper component or device 22. The bob weight 20 has an over-sized cavity 24 and the die-cast upper component or device 22 has a plug 26. Plug 26 protrudes into the bob weight cavity 24 during the assembly process. Plug 26 is approximately co-axial with the string attachment point 28 and the center of gravity 30 of the device 22. The assembly process is as follows:

1) The asymmetrical upper component or device 22 is hung in a calibrated assembly fixture 32 at hanging point 33. By hanging this device as it will be hung in normal use, the relationship between the hanging point 33, the string 34, and the center of gravity 30 of the device 22 is assured to be co-axial with respect to gravity (FIG. 2).

2) The symmetrical bob weight 20 (the lower component of the assembly) is supported in the assembly fixture 32 located directly below the hanging point 33 in the assembly fixture 32. With the asymmetrical device 22 so hung, the center of gravity 30 of the asymmetrical device 22 is about over the center of gravity 36 of the bob weight.

3) In a preferred embodiment, the bob weight is heated with heater 38. The cavity 24 in the bob weight 20 is filled in a preferred embodiment with a molten low-temperature Indium alloy solder 37 and the asymmetrical device 22 is lowered such that the plug hangs into the oversize cavity 24 in the bob weight 20. The cavity 20 in the bob weight 22 must be enough over-sized to allow the worst-case tolerance die-casting device 22 to hang with the plug 26 in the cavity 24 without contacting walls of the bob weight cavity 24. The molten metal solder serves to damp out any swinging motion while the solder cools, and when the solder solidifies, the two components are joined. Because both the device 22 and the bob weight 20 in the assembly are independently oriented to be truly vertical with respect to gravity and the hanging point 33, the assembly after cooling will have a single axis which includes the hanging point 33, the asymmetrical device center of gravity 30, the bob weight center of gravity 36, and the bob weight point 40. Thus the assembly will work as an accurate plumb bob even while rotating on the hanging string (FIG. 3).

Still in other embodiments, bonding material which does not require the application of heat can be used in substitution for the molten solder. Such material could be for example an epoxy or other adhesive.

Figure 4:
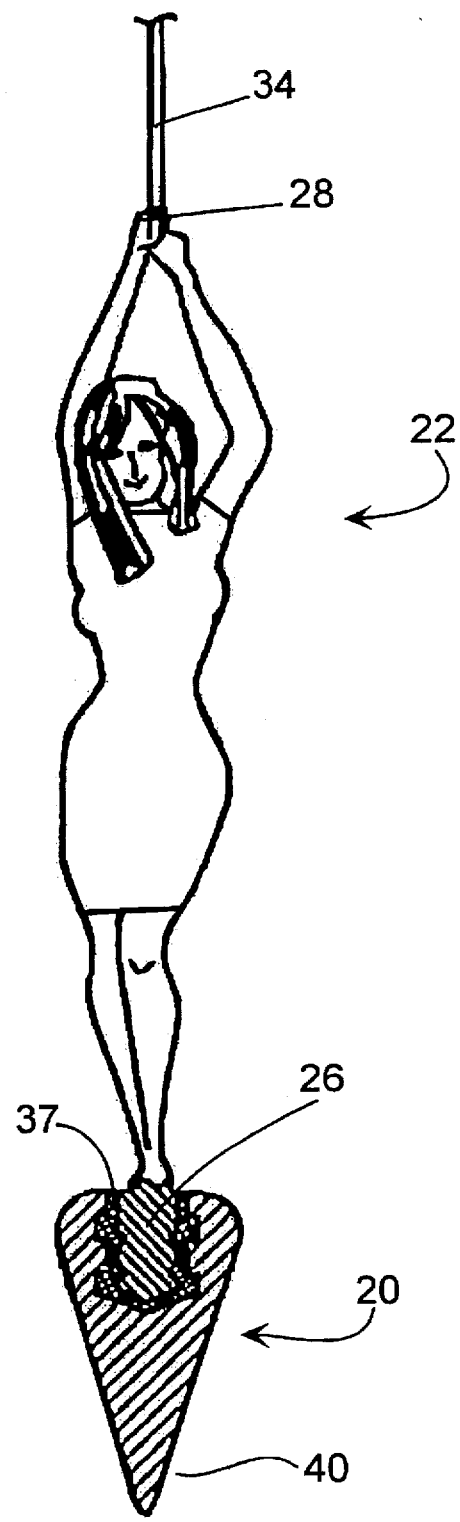
FIG. 4 depicts a view similar to FIG. 3 with the fixtures removed and with a liquid solder solidified such that the asymmetric device is rigidly secured to the plumb weight.

4) The assembly can now be removed from the fixture and tested. If the assembly was incorrect, it can be reinstalled in the fixture, reheated until the solder melts, and then recooled again to correct an incorrect assembly (FIG. 4).

In a preferred embodiment, the asymmetrical device 22 is die-cast zinc to achieve an adequate functional weight. The zinc device 22 is plated to achieve a metallic look of either brass, bronze, chrome, or gold. The bob weight 20 is made from two metals, brass at the top with a stainless steel point.

INDUSTRIAL APPLICABILITY

This plumb bob and method allows for a simple, one-time calibration of an asymmetrical plumb bob. The use of a reversible temperature dependent joining method allows for process speed control through heating and cooling cycles, and it allows for quick reworking which would not be possible if an non-reversible adhesive (as taught by another embodiment of the invention) was used. The use of gravity in the balancing process is far more simple than using a dynamic balancing machine, and by combining the assembly and calibration processes rather than calibrating after assembly, much complexity in the plumb bob design for adjustability is avoided altogether.

We claim:

1. A plumb bob comprising:

an asymmetrical device having a top portion and a bottom portion, with the top portion of the asymmetrical device adapted to be hung from a string;

a bob weight, said bob weight extending from the bottom portion of the asymmetrical device; and said asymmetrical device is in the shape of a human figure.

2. The plumb bob of claim 1 wherein:

said bob weight is symmetrical.

3. The plumb bob of claim 1 wherein:

said bob weight is a shape of revolution.

4. The plumb bob of claim 1 wherein:

said asymmetrical device and said bob weight are formed separately;

said bottom portion of said asymmetrical device defines a plug; and said bob weight defines a cavity which is sized to receive said plug so that said asymmetrical device can be secured in said cavity.

5. The plumb bob of claim 1 wherein;

said asymmetrical device has a first center of gravity;

said bob weight has a second center of gravity; and wherein said first center of gravity is aligned over said second center of gravity.

6. The plumb bob of claim 4 wherein:

said cavity of said bob weight is sized to receive (1) said plug of said asymmetrical device and (2) a material which can secure the plug in the cavity.

7. A plumb bob comprising:

an asymmetrical device having a top portion and a bottom portion, with the top portion of the asymmetrical device adapted to be hung from a string;

a bob weight, said bob weight extending from the bottom portion of the asymmetrical device;

said asymmetrical device and said bob weight are formed separately;

said bottom portion of said asymmetrical device defines a plug;

said bob weight defines a cavity which is sized to receive said plug so that said asymmetrical device can be secured in said cavity;

said cavity of said bob weight is sized to receive (1) said plug of said asymmetrical device and (2) a material which can secure the plug in the cavity; and said material is a liquid solder which when solidified secures the plug in the cavity.

8. A method of making a plumb bob comprising the steps of:

fabricating a device with a first shape;

fabricating a bob weight with a second shape;

aligning the center of gravity of the device with the center of gravity of the bob weight;

securing the device to the bob weight with a material that changes states from a fluid state to a rigid state;

wherein said step of fabricating the device includes fabricating a plug at one end of the device;

wherein said step of fabricating the bob weight includes fabricating a cavity in the bob weight which can receive the plug of the device; and wherein said step of securing includes placing the plug into the cavity along with the material being a liquid solder and allowing the solder to harden.

9. The method of claim 8 including the steps of:

heating the solder in the cavity in order to assist in dampening out any relative motion between the device and the bob weight as the plug is introduced into the cavity.

10. The method of claim 8 including the steps of:

heating the bob weight as the material is introduced into the cavity.

11. A method of making a plumb bob comprising the steps of:

fabricating a device with a first shape and a plug;

fabricating a bob weight with a second shape and a cavity for receiving the plug;

positioning said device over said bob weight with the center of gravity of the device about aligned with the center of gravity of the bob weight and with the plug above the cavity;

heating the bob weight and introducing liquid solder into the cavity;

lowering the device so that the plug is received into the cavity;

allowing any relative motion between the device and the bob weight to attenuate; and removing heat from the bob weight and allowing the solder to solidify.

12. The method of claim 11 including the step of:

fabricating the device with a first shape that is asymmetrical.

13. The method of claim 11 including the step of:

fabricating the bob weight so that it is symmetrical.

14. The method of claim 11 including the step of:

fabricating the device which has a first shape that is asymmetrical and which can be hung from a top portion with the plug located directly below the top portion with the device hung from the top portion.

* * * * *